(12) United States Patent
March et al.

(10) Patent No.: US 8,127,870 B2
(45) Date of Patent: Mar. 6, 2012

(54) LIFTING AND TRANSPORTATION DEVICE

(75) Inventors: Peter Raymond March, Mallala (AU); Kenneth Ian Bell, Northfield (AU)

(73) Assignee: Austech & Design Pty Ltd, Northfield, South Australia (AU)

( * ) Notice: Subject to any disclaimer, the term of this patent is extended or adjusted under 35 U.S.C. 154(b) by 221 days.

(21) Appl. No.: 12/441,103

(22) PCT Filed: Sep. 13, 2007

(86) PCT No.: PCT/AU2007/001351
§ 371 (c)(1),
(2), (4) Date: Mar. 12, 2009

(87) PCT Pub. No.: WO2008/031155
PCT Pub. Date: Mar. 20, 2008

(65) Prior Publication Data
US 2010/0038154 A1   Feb. 18, 2010

(30) Foreign Application Priority Data
Sep. 13, 2006   (AU) ................................ 2006905042

(51) Int. Cl.
*B62D 51/04* (2006.01)
(52) U.S. Cl. ........................................ 180/6.5; 180/19.1

(58) Field of Classification Search .................... 180/6.2, 180/6.48, 6.5, 19.1, 19.2, 19.3
See application file for complete search history.

(56) References Cited

U.S. PATENT DOCUMENTS 2,846,018 A * 8/1958 Puckett .......................... 187/231
(Continued)

FOREIGN PATENT DOCUMENTS
AU              731085 B3        3/2001
(Continued)

*Primary Examiner* — Kevin Hurley
(74) *Attorney, Agent, or Firm* — The Webb Law Firm (57) ABSTRACT

An improved lifting and transportation device including an attachment means adapted to engage a wheeled device to be transported; and one or more driving wheels adapted to engage the ground to propel said lifting and a transportation device, whereby, said lifting and transportation device is steerable by the independent engagement of said driving wheels; and a controller adapted to control the motion of said driving wheels and control the operation of said attachment means. The attachment means may be an attachment assembly with laterally opposed attachment brackets adapted to engage said wheeled device, whereby, a vertical actuator is used to adjust the vertical height of said attachment assembly and a horizontal actuator is used to adjust the horizontal separation of said laterally opposed attachment brackets

12 Claims, 7 Drawing Sheets

U.S. PATENT DOCUMENTS

| | | | |
|---|---|---|---|
| 3,704,758 A * | 12/1972 | Cropp | 180/19.1 |
| 3,876,024 A | 4/1975 | Shieman et al. | |
| 4,008,778 A * | 2/1977 | Mitchell | 180/6.5 |
| 5,050,695 A | 9/1991 | Kleinwolterink, Jr. | |
| 5,580,207 A * | 12/1996 | Kiebooms et al. | 414/495 |
| 5,735,361 A * | 4/1998 | Forrest | 180/6.24 |
| 6,241,047 B1 * | 6/2001 | Gilliland et al. | 187/222 |
| 6,276,471 B1 * | 8/2001 | Kratzenberg et al. | 180/19.3 |
| 6,325,168 B1 * | 12/2001 | Hillel | 180/14.1 |
| 7,210,545 B1 * | 5/2007 | Waid | 180/65.1 |
| 7,264,068 B2 * | 9/2007 | Priepke | 180/6.24 |
| 7,270,201 B1 * | 9/2007 | Cryer | 180/19.2 |
| 7,712,558 B2 * | 5/2010 | Helson et al. | 180/19.3 |
| 7,735,586 B2 * | 6/2010 | Hammerl | 180/19.1 |
| 7,762,361 B2 * | 7/2010 | Hammonds | 180/6.48 |
| 7,802,642 B2 * | 9/2010 | Jensen et al. | 180/6.5 |
| 7,886,853 B2 * | 2/2011 | Konopa | 180/19.1 |
| 2005/0236194 A1 * | 10/2005 | Kidd et al. | 180/16 |

FOREIGN PATENT DOCUMENTS

| | | |
|---|---|---|
| DE | 3139295 A1 | 6/1982 |
| DE | 19918605 C1 | 3/2000 |
| JP | 2001346836 A | 12/2001 |
| JP | 2004275614 A | 10/2004 |
| NL | 1016924 C2 | 6/2002 |

* cited by examiner

LIFTING AND TRANSPORTATION DEVICE

FIELD OF THE INVENTION

The present invention relates to an improved lifting and transportation device. In particular, a detachable transportation device for use with manually operated wheelchairs.

BACKGROUND OF THE INVENTION

Wheelchairs are typically manually operated or power driven, depending on the requirements of the user. Power driven wheelchairs are driven by ground engaging wheels, with an electric motor and gearbox arrangement supplying the wheels with the necessary motion to propel the wheelchair in the desired direction. This arrangement is both bulky and heavy. Typically, a power driven wheelchair will contain more than one electric motor, gearbox and battery and have a frame adapted to support the additional weight. The additional components are required to move the wheelchair in the desired direction and supply enough torque to move the load, consisting of the wheelchair frame, drive system and user.

Manually operated wheelchairs therefore possess certain advantages over power driven wheelchairs. Manual wheelchairs are significantly lighter, allowing for a lighter construction, and have the ability to be dismantled for ease of storage and portability. Manually operated wheelchairs can therefore be transported more easily in vehicles and do not require the need for trailers or specific wheelchair carrying devices. There are also advantages with the simplicity of design of manually operated wheelchairs, as there is obviously less equipment to malfunction. In the event of a power operated wheelchair malfunctioning, it generally cannot be easily operated manually due to its weight. It is therefore desirable for a person to have both a powered and manually operated wheelchair at their disposal, adding further costs to the user.

Buildings and public infrastructure, such as railway terminals, bus stops, and footpaths, now have ramps for disabled and wheelchair access. However, some of these ramps are too steep for a user to traverse with a manually operated wheelchair and they require the assistance of an additional person. The additional person is therefore required to exert significant effort, which may result in injury to that person and/or the wheelchair user. In locations where a person, such as a staff member, is subjected to the repetitive stresses of assisting a manually operated wheelchair user up an incline repeatedly, the chance of injury is greatly increased.

It is therefore an object of the present invention to overcome the aforementioned problems and to provide the public with a useful alternative.

SUMMARY OF THE INVENTION

Therefore in one form of the invention there is an improved lifting and transportation device proposed comprising:
an attachment means adapted to engage a wheeled device to be transported; and
a pair of driving wheels adapted to engage the ground to propel said lifting and transportation device, whereby, said lifting and transportation device is steerable by the independent engagement of said driving wheels; and
a controller adapted to control the motion of said driving wheels and control the operation of said attachment means.

Preferably said transportation and lifting device includes at least one rotatable castor wheel.

Preferably each said driving wheel is rotated by a corresponding electric motor and gearbox.

Preferably said transportation and lifting device includes at least one battery to supply power to said electric motors and said attachment means.

Preferably said attachment means includes an attachment assembly with laterally opposed attachment brackets adapted to engage said wheeled device, whereby, a vertical actuator is used to adjust the vertical height of said attachment assembly and a horizontal actuator is used to adjust the horizontal separation of said laterally opposed attachment brackets.

Preferably said vertical actuator can be adapted to lift said wheeled device vertically, whist said attachment brackets are engaging the wheeled device.

Preferably said wheeled device is typically a wheelchair and said attachment brackets are adapted to be attached to vertical struts of said wheelchair frame.

Preferably said attachment brackets are pivotable, maintaining a perpendicular attachment between said attachment brackets and said vertical struts of the wheelchair.

Preferably said transportation and lifting device is adapted to be positioned within said wheelchair frame, whilst engaged to said wheelchair, so that said driving wheels are located parallel to the wheelchair's rear wheels.

Preferably said controller is detachably mounted on a controller arm.

Preferably said controller arm is extendable and detachably mounted to said transportation and lifting device.

Preferably said laterally opposed attachment brackets can be replaced with a clamping mechanism adapted to engage a horizontal strut of the wheeled device frame.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention.

Figure 1:
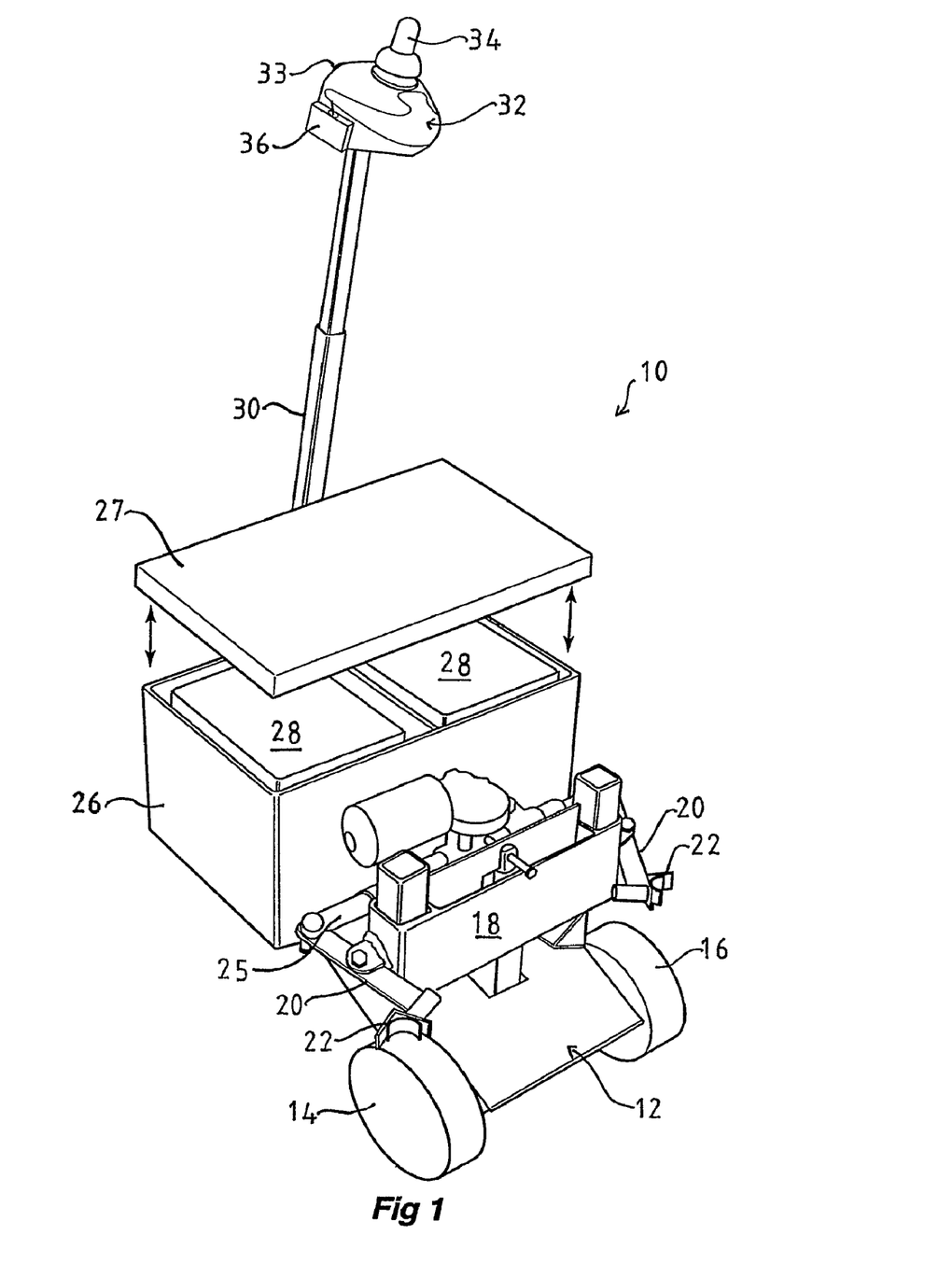
FIG. 1 illustrates a perspective view of a transportation device.

FIG. 1 shows a perspective view of a transportation device 10 comprising a frame 12, adapted to support both the transportation device driving mechanism and an attachment mechanism for the attachment of the device to a wheelchair. The transportation device 10 can be used to transport any manner of wheeled devices requiring a detachable drive system to assist users during manual operation. Typically, the device is to be used on manually operated wheelchairs as a detachable drive system.

The device 10 is driven by a pair of ground engaging wheels 14 and 16, with each wheel having its own motor and gearbox arrangement (not shown in this figure). Also attached to the frame 12, is the attachment mechanism comprising of a vertically moveable assembly 18. The assembly 18 is raised or lowered using an actuator, by the user, to accommodate different purpose and different dimensioned wheelchairs. In order for the device 10 to be compatible with a large variety of wheelchairs, the attachment mechanism, comprising of two attachment arms 20 and two attachment brackets 22, must be adapted to move in and out depending on the width of the wheelchair frame. This is achieved using a horizontal actuator 24, which can horizontally separate two laterally opposed horizontal arms 25 according to the width required. The device 10 is also narrower than the majority of wheelchairs, so as to fit within the majority of wheelchair frames.

The device frame also supports a battery case 26 containing two 12 volt batteries 28, installed to provide power to the two driving wheels 14 and 16. It is envisaged that an alternative power arrangement could be used. The battery case 26 has a detachable lid 27 attached to protect the batteries 18. An extendable controller stand 30, attached to the frame 12, supports a detachable controller unit 32. The controller unit 32 can be operated from its position atop of the extendable stand 30 by a user operating the device to move both the wheelchair and the person within. However, should the wheelchair user not require additional assistance, the control unit 32 can be detached and operated by the wheelchair user. The device 10 then functions as a detachable transportation device and should the person require this facility regularly, different sized wheels and gearing could be employed to ensure a smoother ride.

The controller unit has a mode button 33, allowing multiple uses of the joystick 34 both to direct movement of the wheelchair and the attachment mechanism. The joystick can be used to activate the horizontal actuator 24 and move the horizontal arms 25 in or out depending on the width of the wheelchair. Due to a pivot arrangement, moving the horizontal arms inwards will force the attachment brackets 22 outwards towards the wheelchair frame, similarly, moving the horizontal arms outwards will retract the attachment brackets 22. There is also a toggle switch 36, located on the control unit 32, used to raise or lower a vertical actuator to move the attachment frame 18 and subsequently the attachment brackets 22 vertically to the desired position on a wheelchair. Once the device 10 is attached to the wheelchair in the desire position, the joy stick 34 can be used to direct power to the driving wheels 14 and 16 and direct the wheelchair. Having each wheel moving independently allows for the tighter turning circle and greater manoeuvrability of the wheelchair.

Figure 2:
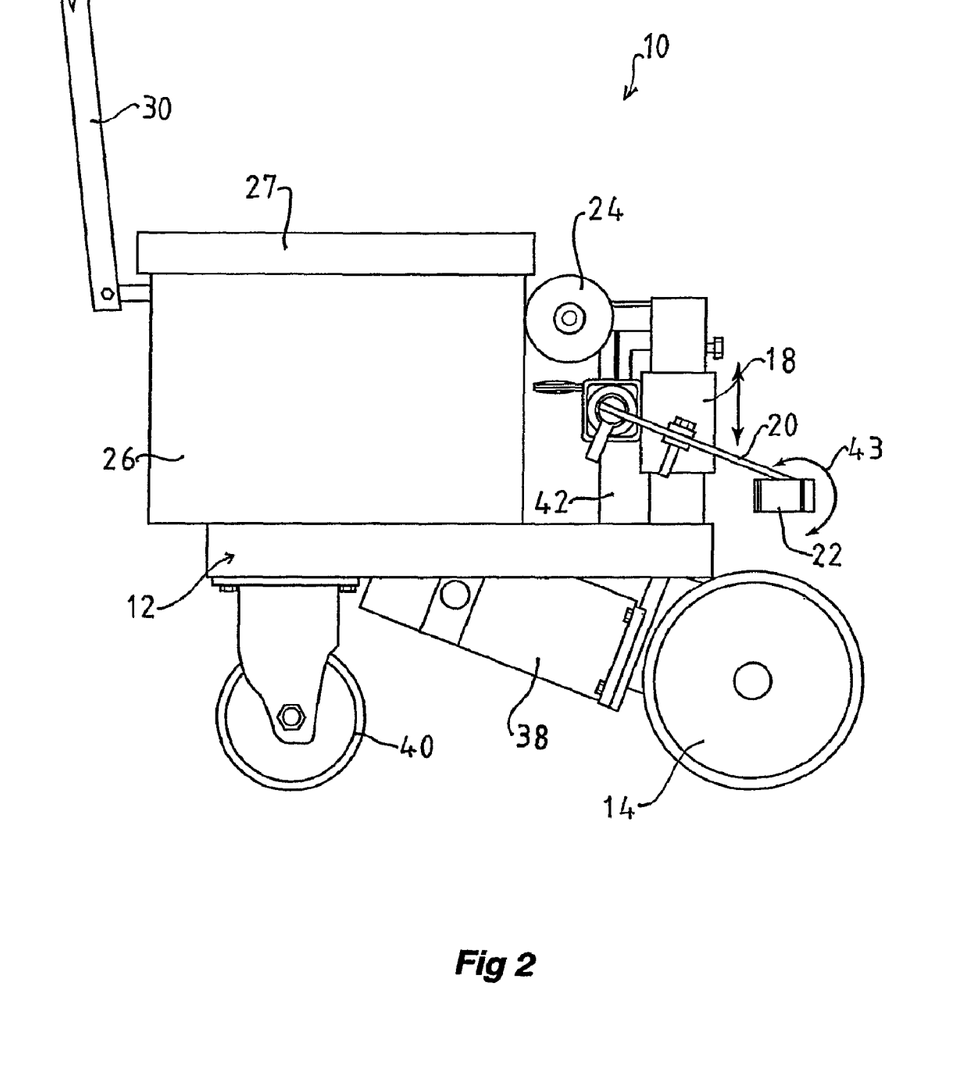
FIG. 2 illustrates a side view of a transportation device.

FIG. 2 shows a side view of the device 10 with the motor and gearbox arrangement 38 for the ground engaging wheel 14 visible. The motor and gearbox arrangement for the wheel 16 is not shown in this figure as it is located directly behind the motor 38. Also shown in this figure is the rear castor wheel 40. In this embodiment only one rotatable rear wheel is used for extra mobility, however, it is possible for the device to have more than one non driving wheel. The rear wheel 40 is attached to the transportation device frame 12 centrally. Also attached to the frame is the battery case 26 and the extendable stand 30 attached thereto. It can be seen that the stand 30 can be detached from the case 26 for ease of transportation.

The adjustment assembly 18 is vertically moved by the vertical actuator 42. This allows the attachment brackets 22 to be attached to a wheel chair frame in a position free of any cross bracing or any other obstacles. From this figure, it is also clear that the brackets 22 rotate in the direction of the arrow 43, allowing for the brackets to retain the wheelchair in a position parallel to the ground, regardless of the slope of the ground. This is especially important in traversing ramps and other steep slopes.

Figure 3:
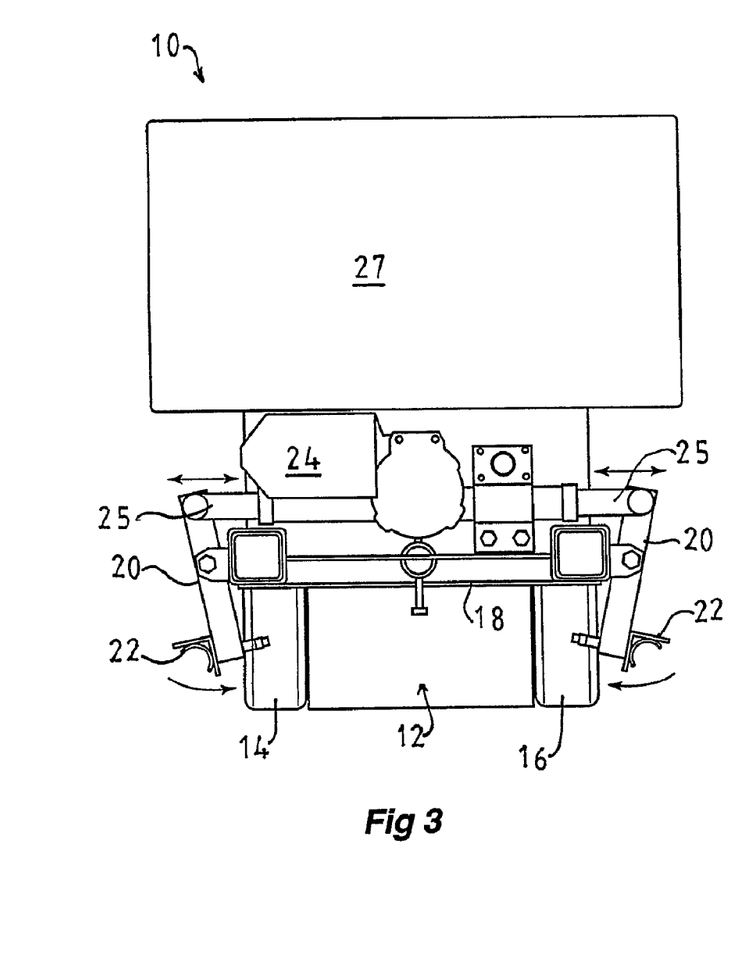
FIG. 3 illustrates a top view of a transportation device before engaging a wheelchair.
Figure 4:
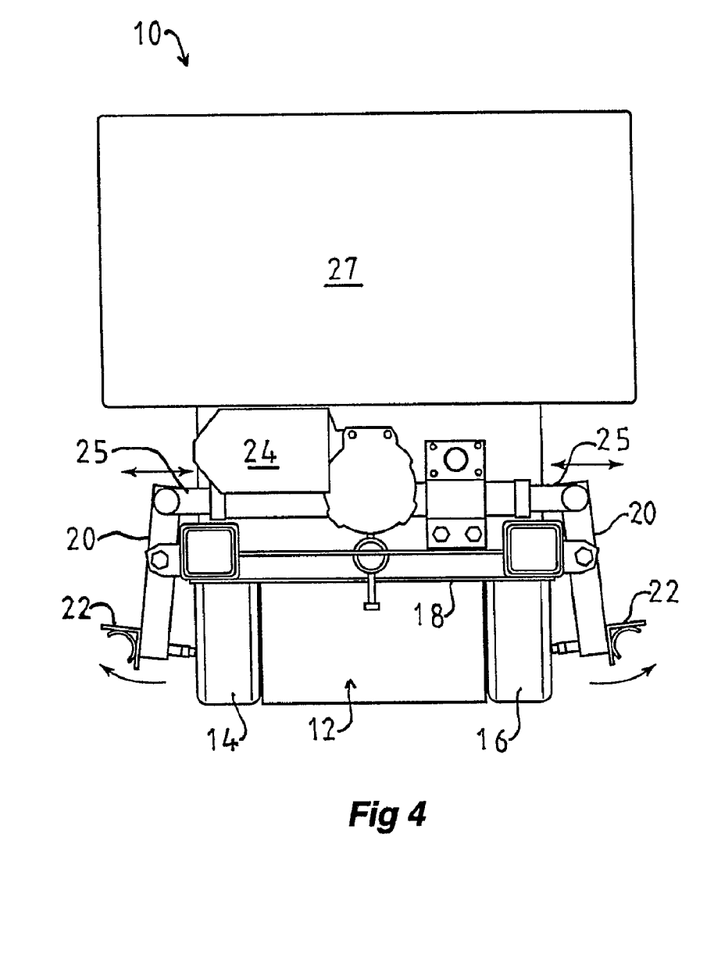
FIG. 4 illustrates a top view of a transportation device in an engaged state.

FIG. 3 and FIG. 4 show a top view of the device 10 and the attachment device in both its unattached and the attached states respectively. In the unattached state, brackets 22 are closest together in a position defined by the width of the device 10. This allows the device 10 to transport any width of wheelchair with a frame greater than the width of the device. In this position, the horizontal actuator 24 has the horizontal arms 25 in their most outwards position. FIG. 4 shows the horizontal actuator 24 bringing in the horizontal arms 25 and in turn bringing out the attachment brackets 22, due to the pivot located on the attachment airs 20. The attachment brackets 22 continue to be forced wider, by the horizontal actuator 24, until they exert a predetermined lateral force on the wheelchair being attached. This force is sufficient to retain the wheelchair but not sufficient to distort the wheelchair frame. The brackets 22 are shaped so to engage with the vertical up stands of the wheelchair frame.

Figure 5:
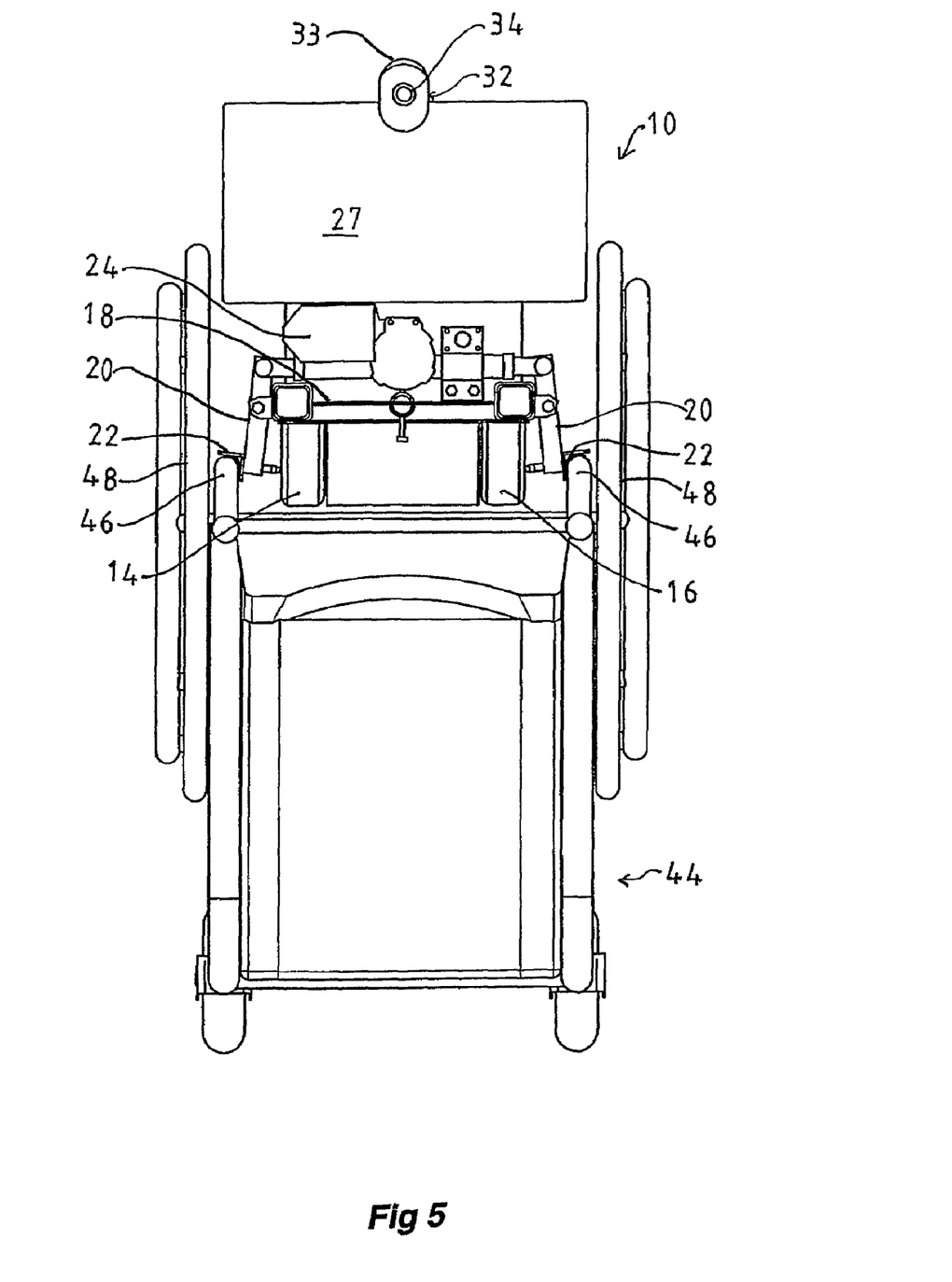
FIG. 5 illustrates a top view of a transportation device attached to a wheelchair.

FIG. 5 shows a transportation device 10 attached to a wheelchair 44. The attachment brackets 22 are forced outwards exerting a lateral pressure on the vertical struts 46 of a wheelchair 44. The ground engaging wheels 14 and 16 of the device 10 are located in a position in line with the wheelchair's rear wheels 48. This allows for smoother wheelchair travel, with it behaving as it would were it operated manually. Thus, the addition of the device 10 does not restrict any of the wheelchair's functionality and mobility. The user also experiences a familiar riding experience and can easily learn and adapt to use the control unit 32. The device 10, when attached to the wheelchair 44, uses its drive wheels 14 and 16 to propel the wheelchair in a given direction with the wheelchair's wheels 48 still engaging the ground. Thus, the wheelchairs own wheels 48 are used to distribute weight to the ground and provide a more comfortable ride. The vertical actuator 42 could be used to raise the wheels of the wheelchair 44 whilst being transported. However, this function is envisaged to be used with other wheeled devices requiring transportation.

Figure 6:
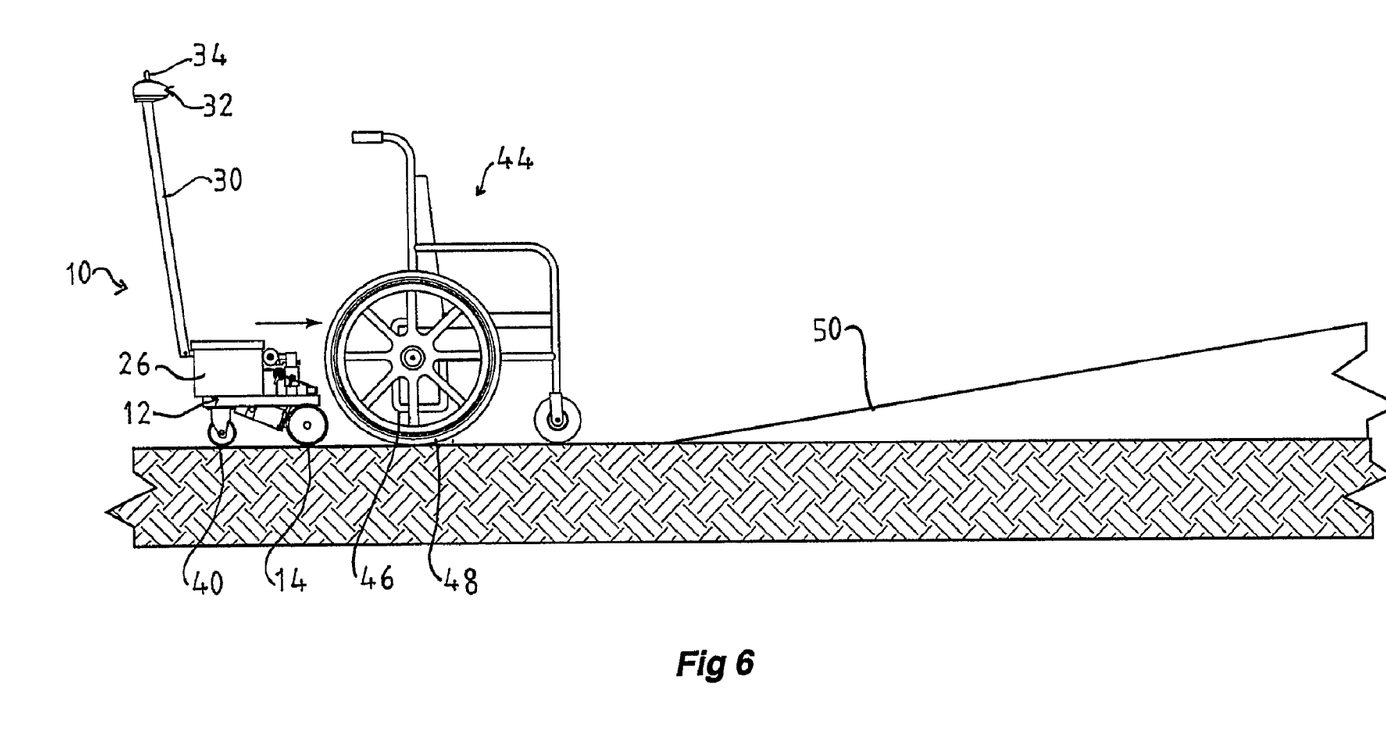
FIG. 6 illustrates a side view of a transportation device and a wheelchair awaiting engagement to traverse a ramp.
Figure 7:
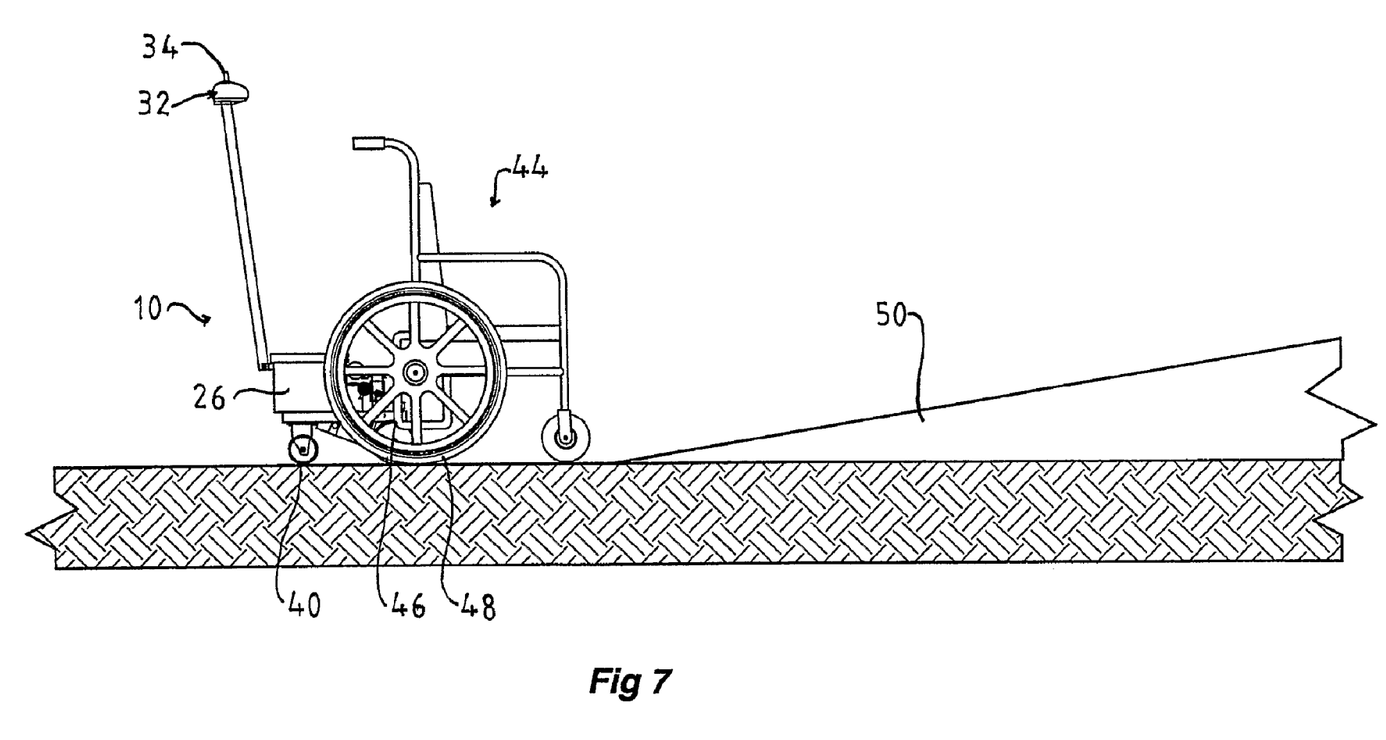
FIG. 7 illustrates a side view of a transportation device engaging a wheelchair before traversing a ramp.
Figure 8:
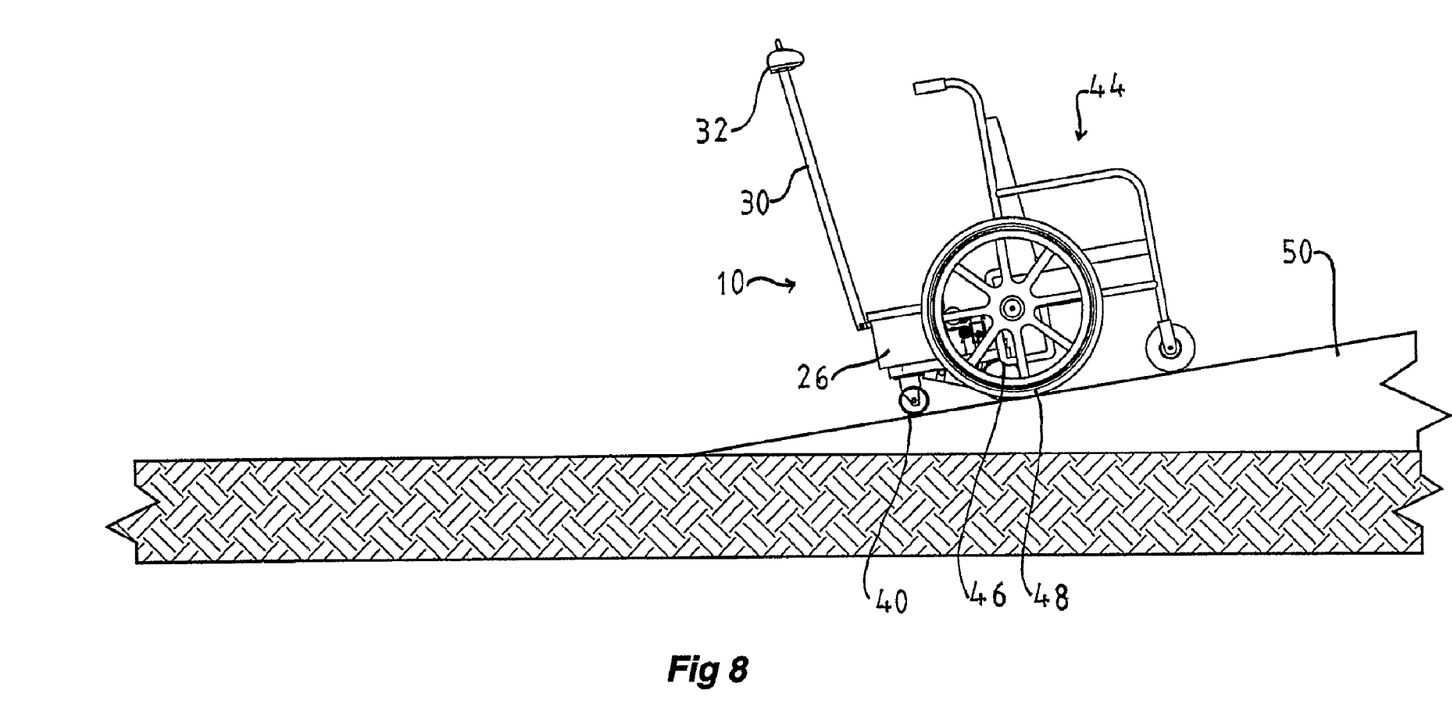
FIG. 8 illustrates a side view of a transportation device and a wheelchair traversing a ramp.

FIG. 6 shows a wheelchair 44, placed in a position to have the device 10 attached. The device 10 is used in the situation where the wheelchair user, either with or without the help of an assistant, cannot traverse the upcoming ramp 50. FIG. 7 shows the transportation device 10 being attached to the wheelchair 44 and FIG. 8 shows the wheel 44 and device 10 traversing the ramp 50. Not shown in these figures is; the wheelchair user, and an assistant, operating the device 10.

The device may also have an alternative attaching mechanism to be adapted to uses other than transporting wheelchairs. A clamp arrangement could be used, instead of the horizontally expanding attachment brackets 22, to clamp onto the horizontal frame strut of any wheeled device requiring transportation. For example, the device could be used in the situation where a user is unable to negotiate a trolley up an incline and requires assistance. The device 10 could be adapted to assist the movement of such a trolley with a suitable attachment clamp. In order to traverse a greater variety of slopes and surfaces, the wheels of such a trolley can be raised or lowered using the vertical actuator 42.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A lifting and transportation device comprising:
   an attachment assembly including laterally opposed attachment brackets adapted to engage a wheeled device to be transported;
   a means of adjusting the vertical height of and the lateral separation between said attachment brackets;
   one or more driving wheels adapted to engage the ground to propel said lifting and transportation device; and
   a controller adapted to control the operation of said attachment assembly.

2. The lifting and transportation device according to claim 1, wherein said lifting and transportation device is steerable by the independent engagement of said one or more driving wheels, said device further including at least one rotatable castor wheel.

3. The lifting and transportation device according to claim 2, wherein each said driving wheel is rotated by a corresponding electric motor and gearbox associated with said controller such that said controller is used to control the motion of said or more driving wheels.

4. The lifting and transportation device according to claim 1, wherein said lifting and transportation device includes at least one battery to supply power to said electric motors and said attachment means.

5. The lifting and transportation device according to claim 1, wherein said means of adjusting the vertical height of and the lateral separation between said attachment brackets is in the form of a vertical and horizontal actuator, respectively.

6. The lifting and transportation device according to claim 5, wherein said vertical actuator can be adapted to lift said wheeled device vertically, while said attachment brackets are engaging the wheeled device.

7. The lifting and transportation device according to claim 5, wherein said wheeled device is a wheelchair having a frame and said attachment brackets are adapted to be attached to vertical struts of said wheelchair frame.

8. The lifting and transportation device according to claim 7, wherein said attachment brackets are pivotable, and maintain a perpendicular attachment between said attachment brackets and said vertical struts of the wheelchair.

9. The lifting and transportation device according to claim 7, wherein said lifting and transportation device is adapted to be positioned within said wheelchair frame, while engaged to said wheelchair, so that said driving wheels are located parallel to the wheelchair's rear wheels.

10. The lifting and transportation device according to claim 5, wherein said controller is detachably mounted on a controller arm.

11. The lifting and transportation device according to claim 5, wherein said controller arm is extendable and detachably mounted to said lifting and transportation device.

12. The lifting and transportation device according to claim 7, wherein said attachment brackets can be replaced with a clamping mechanism adapted to engage a horizontal strut of the wheeled device frame.

* * * * *